United States Patent
Ruzicka

(10) Patent No.: US 9,434,544 B1
(45) Date of Patent: Sep. 6, 2016

(54) DUSTLESS SPOUT ASSEMBLY

(71) Applicant: Coy N. Haraway, Cordova, TN (US)

(72) Inventor: Bo James Ruzicka, La Porte City, IA (US)

(73) Assignee: Coy N. Haraway, Cordova, TN (US)

( * ) Notice: Subject to any disclaimer, the term of this patent is extended or adjusted under 35 U.S.C. 154(b) by 216 days.

(21) Appl. No.: 14/248,381

(22) Filed: Apr. 9, 2014

Related U.S. Application Data

(60) Provisional application No. 61/811,339, filed on Apr. 12, 2013.

(51) Int. Cl.
*B65G 11/20* (2006.01)

(52) U.S. Cl.
CPC .................................. *B65G 11/206* (2013.01)

(58) Field of Classification Search
CPC ... B65G 11/206; B65G 11/146; B65G 11/20; B65G 11/203
USPC ............................................ 198/534; 193/32
See application file for complete search history.

(56) References Cited

U.S. PATENT DOCUMENTS

| | | |
|---|---|---|
| 1,024,297 A | 4/1912 | Thompson |
| 1,231,778 A | 7/1917 | Nall |
| 1,668,218 A | 5/1928 | Sherban |
| 1,820,297 A | 8/1931 | Butler |
| 2,035,329 A | 3/1936 | McPhail |
| 2,094,707 A | 10/1937 | Jones |
| 2,120,506 A | 6/1938 | O'Rourke |
| 2,217,710 A | 10/1940 | Shaler |
| 2,294,290 A | 8/1942 | Freeman |
| 2,611,876 A * | 9/1952 | Hartman ................. H01J 40/14 193/32 |
| 2,617,531 A | 11/1952 | Palmer |
| 2,634,842 A * | 4/1953 | Caylor ................... B65G 69/00 193/32 |
| 2,676,668 A | 4/1954 | Lindsay |
| 2,761,186 A | 9/1956 | Peterson |
| 2,791,355 A | 5/1957 | Morgan, Jr. |
| 2,913,145 A | 11/1959 | Hopkins et al. |
| 2,968,400 A | 1/1961 | Clute |
| 2,976,676 A | 3/1961 | Kress |
| 3,005,547 A | 10/1961 | Freeman |
| 3,081,009 A * | 3/1963 | Cooper ................... B03B 5/623 193/32 |
| 3,167,089 A | 1/1965 | Gordon |
| 3,223,215 A | 12/1965 | Budjinski et al. |
| 3,254,869 A | 6/1966 | Easey |
| 3,365,240 A | 1/1968 | Gordon |
| 3,485,420 A | 12/1969 | Lucas |
| 3,491,923 A | 1/1970 | Osipov |

(Continued)

FOREIGN PATENT DOCUMENTS

FR 69669 E 11/1958

*Primary Examiner* — Mark A Deuble

(74) *Attorney, Agent, or Firm* — Wood, Herron & Evans, LLP

(57) ABSTRACT

A spout controls grain or other particulate material falling through and being discharged from a conduit. An array of plates is mounted at the discharge end of a chute to control the flow of the particulate material there from. A counterbalance mechanism is coupled to each of the plates and can be precisely adjusted to provide the appropriate counterbalancing force on the plates to control the particulate material flow without damage to the particulate material and to minimize the dust generated in the flow of the material. A divider is mounted in the stream of material flowing to the array of plates to reduce the dust escaping the flowing material.

23 Claims, 7 Drawing Sheets

(56) References Cited

U.S. PATENT DOCUMENTS

| | | |
|---|---|---|
| 3,794,386 A | 2/1974 | Hite |
| 3,923,210 A | 12/1975 | Jackson |
| 4,203,535 A | 5/1980 | Burnett et al. |
| 4,255,033 A * | 3/1981 | Rose ............ H04N 11/00 156/58 |
| 4,342,383 A | 8/1982 | Burnett |
| 4,410,076 A | 10/1983 | West et al. |
| 4,552,573 A | 11/1985 | Weis et al. |
| 5,016,686 A * | 5/1991 | Gerstenkorn ........ B65G 69/181 141/95 |
| 5,154,271 A * | 10/1992 | Binzen ............ B65G 11/146 193/25 C |
| 6,085,987 A | 7/2000 | Haraway |
| 7,364,034 B1 | 4/2008 | Clark et al. |
| 7,770,713 B2 * | 8/2010 | Nakagawa ............ B65B 3/26 198/530 |
| 2012/0090956 A1 | 4/2012 | Brobst |

* cited by examiner

DUSTLESS SPOUT ASSEMBLY

This claims the benefit of U.S. Provisional Patent Application Ser. No. 61/811,339, filed Apr. 12, 2013, which is hereby incorporated by reference in its entirety.

BACKGROUND OF THE INVENTION

Grain and other particulate material falling uncontrolled at high velocities causes: (1) damage to the grain and other particulate material and (2) creates dust. The damage occurs both during fall in a downwardly inclined conduit, as well as upon impact after discharge from the conduit. The damage is apparently caused by particle-to-conduit abrasion and particle-to-particle impact, and these interactions cause fines and dust.

The velocity increase of the material is most rapid in a vertical conduit, but even in a slanting conduit, velocities of several hundred feet per minute are attained in a few feet. A free-falling stream of such material tends to reach a terminal velocity because the air currents within and around the stream cause turbulence when the stream is unconfined. Upon discharge, grain or other particulate material flowing in conduits can reach velocities well above such terminal velocities. In a long conduit, the velocity of the stream can exceed even two thousand feet per minute. It is believed that the damaging velocity is not highly dependent on the angulation of the conduit. As such, the damaging velocity is roughly the same for a given stream whether it is falling in a vertical conduit or an angled conduit.

For a given type of grain or other particulate material, a velocity of 1600 feet per minute is the approximate damaging velocity in many cases. Damage to the material and creation of dust as the result of high conduit velocities also occurs with materials other than grain, although it is most important in respect to grain because of the relative frangibility and layered structure of grain kernels.

To prevent a falling particulate stream of material from exceeding damaging velocity and generating excessive dust, one straightforward approach is to limit the distance of the drop or to angulate the conduit so that the velocity increase is diminished. However, it is difficult to avoid a substantial elevation change in many instances, as for example in loading grain or other particulate material into the hold of a ship.

A flow restriction in the path of the falling material may slow the material velocity. This is often achieved by devices called "dead boxes" which have a narrow fixed throat section mounted directly in the conduit. However, dead boxes are effective primarily in those situations where the grain or other particulate material flow rate (i.e., bushels per hour) is constant or within a relatively narrow range so as to avoid "surges." However, constant velocity is not usually the case. In the typical situation, surges, abrupt changes in flow rate, occur repeatedly. Surging occurs, for example, when a conveyor bucket empties into the upper end of the chute and a period of lower flow may follow, until another bucket refills the chute. Non-uniform moisture content in the grain or other particulate material is another cause of surges.

When the flow rate is uneven, the use of a fixed restriction such as a dead box to retard flow is of little effect. In periods of low flow rate, the small stream passes almost unrestrained through the throat opening, but at periods of heavy flow, a "head" of grain or other particulate material builds up rapidly above the throat. This can cause bridging or clogging which can choke off flow completely.

In addition to the problem of damage to the grain or particulate material due to high falling velocities, air entrained within the falling stream is a significant problem due to the creation of dust. Ambient dust as a result of a falling stream of particulate material typically requires workers to wear masks or other protective gear. Furthermore, the work environment is clouded by the dust and workers have difficulty seeing for secure footing and evaluation of the level of fill of the vessel receiving the grain or particulate material.

Known methods and apparatus attempting to reduce the dust and fall velocity of grain or other particulate material in vertical conduits by which the velocity can be prevented from exceeding the damaging value even under widely varying flow rates are disclosed in U.S. Pat. Nos. 6,085,987 and 4,342,383, each of which is hereby incorporated by reference in its entirety.

The devices in each of these cited patents include an array of downwardly and inwardly sloping blades supported by the body of an accumulator. The blades have lower ends which define an opening between them, the opening having an area that at its maximum is substantially smaller than the area of the conduit. The overlapping blades are angled inwardly so that they deflect the grain particles centrally as they fall. The inward deflection of the particles toward the smaller area of the throat causes a mass of grain or other particulate material particles to accumulate above the blades and over the opening in an accumulation chamber within the conduit.

Variable biasing means act on the blades to urge them inwardly and the biasing means is responsive to the weight of the accumulated mass of the particles to provide a larger opening as the weight increases, thereby releasing particles more rapidly from the accumulation space above the blades and reducing the area of the opening as the weight of particles decreases.

However, the adjustability of the biasing mechanism disclosed in these patents in some instances is inadequate. In an accumulator or regulating device, it is important to keep the biasing force of the blades on the grain or other particulate material flow without applying excessive force to cause the grain or other particulate material to back-up and the accumulation mass above the gate or opening of the blades to grow too large and become clogged or jammed.

As such, there is a need for an improved system for regulating the flow of grain or other particulate material that overcomes these and other problems in the art, particularly the excessive generation of dust and damage to the falling grain or other material without creating a blockage of accumulated grain.

SUMMARY OF THE INVENTION

These and other objectives of this invention have been attained by a spout to control grain or other particulate material falling through and being discharged from a conduit. In one embodiment of this invention, an array of plates is mounted at the discharge end of a chute to control the flow of the particulate material there from. A counterbalance mechanism is coupled to each of the plates and can be precisely adjusted to provide the appropriate counterbalancing force on the plates to control the particulate material flow without damage to the particulate material and to minimize the dust generated in the flow of the material. A divider is mounted in the stream of material flowing to the array of plates to reduce the dust escaping the flowing material. The divider splits the flow of particulate material into at least two split streams and a void region is created below the divider to control the dust.

As the grain flows through the chute section and around the divider, it enters a funnel as the split streams are merged together. As the grain exits the funnel, it enters a spout and engages the plates. As the weight of the grain impinges upon the plates, the plates are urged outwardly against the bias of the counterbalance mechanism to increase the open area for the grain to flow through the spout. As the flow of grain decreases, the weight of the grain on the plates likewise decreases and the bias of the counterbalance mechanism springs urges the plates inwardly thereby directing and focusing the flow of the grain through the assembly. Advantageously, the void region proximate the divider entraps the dust and collects it and circulates it back into the split streams of grain thereby minimizing the escape of the dust during the transfer process of the grain through the assembly.

BRIEF DESCRIPTION OF THE DRAWINGS

The features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
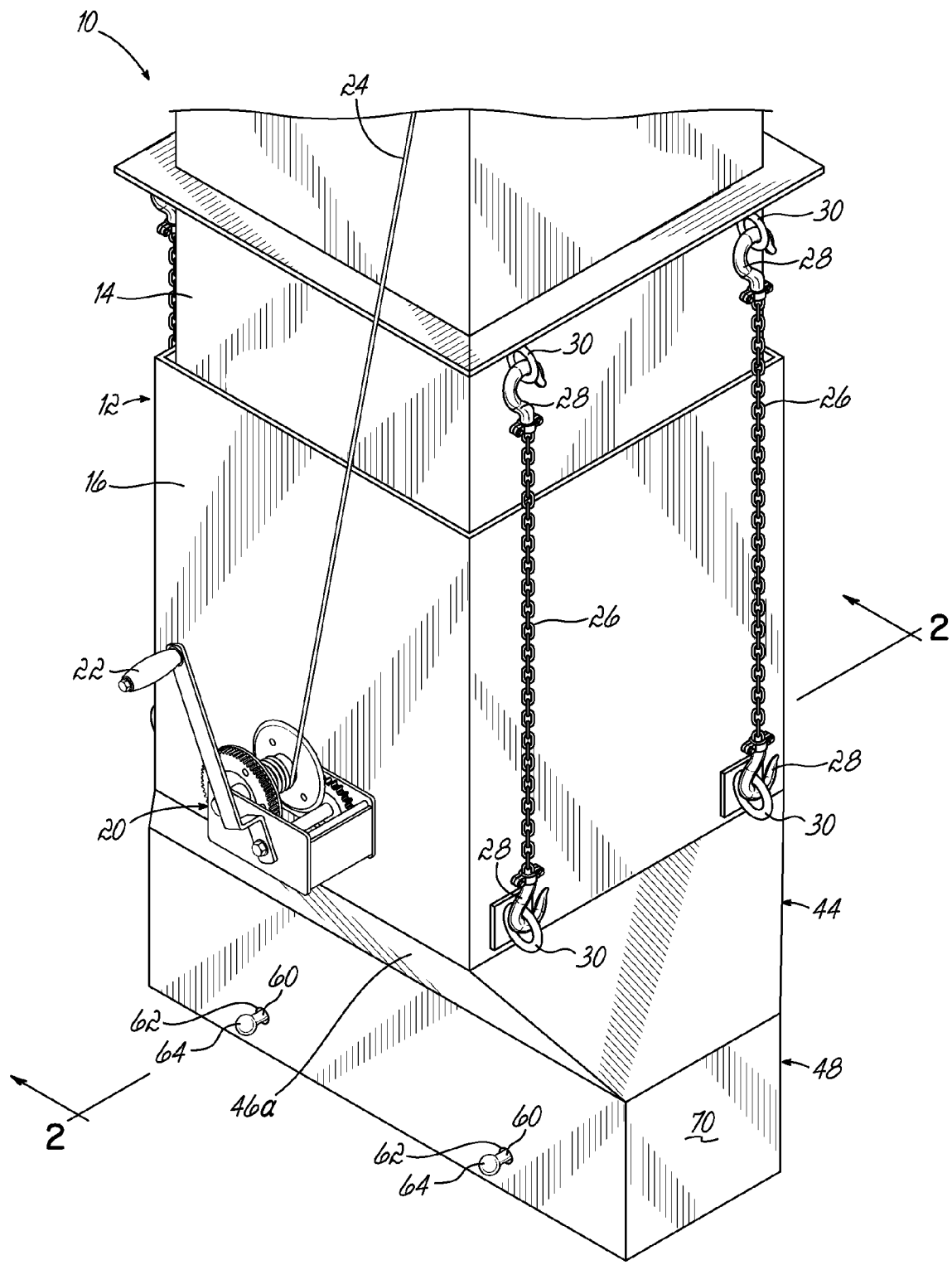
FIG. 1 is a perspective view of one embodiment of a spout assembly according to this invention.
Figure 2:
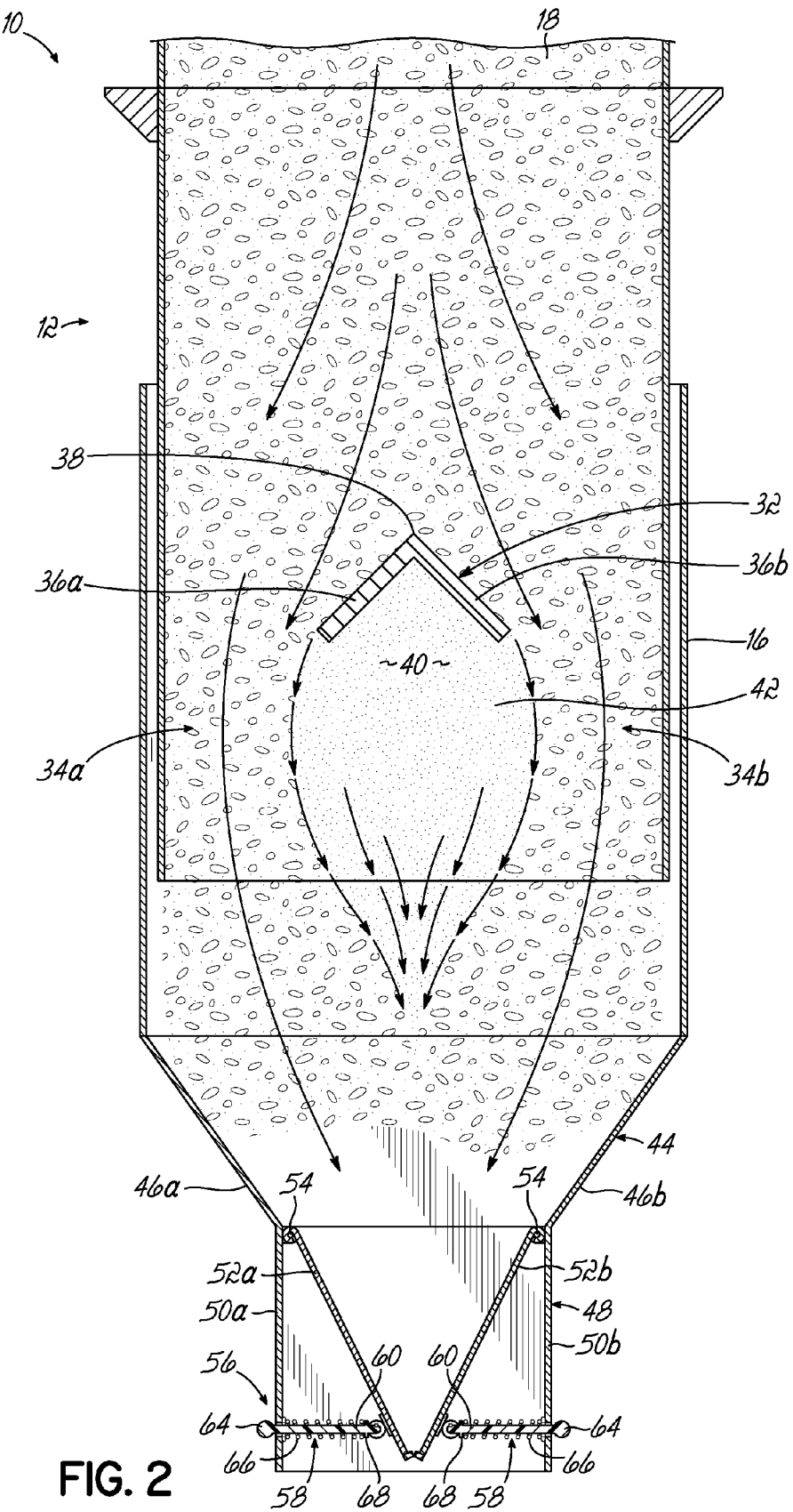
FIG. 2 is a cross-sectional view of the spout assembly of FIG. 1 with grain flowing through it.

Referring to FIG. 1, a perspective view of one embodiment of a dustless spout assembly 10 according to this invention is shown. Cross-sectional views of the spout assembly 10 are likewise shown in FIGS. 2-3B. The assembly 10 includes an upper chute section 12 formed by an upper and a lower chute 14, 16 telescopically mated together. While two chutes are shown and described, this invention is not limited to two chutes and only one chute or more than two chutes can be used. The upper chute 14 is received within the lower chute 16 as shown in FIG. 2. In one embodiment, the outer perimeter dimension of the lower chute 16 is 23 inches by 23 inches and the similar dimensions of the upper chute 14 are likewise designed to matingly fit within the lower chute 16. In operation, the spout assembly 10 is adapted for the transfer of grain, corn or other particulate material 18 in a generally vertical downward direction from a supply of grain 18 into a rail car, cargo hold or other receptacle at the downstream exit end of the assembly 10.

The length of the chute section 12 of the assembly 10 is adjustable to accommodate different delivery environments for the grain 18. In the embodiment shown in FIGS. 1-3B, the relative positions of the upper and lower chutes 14, 16 are telescopically adjustable and this may be accomplished in any one of a variety of manners including a winch 20 mounted to an outer surface of the lower chute 16 as shown in FIG. 1. The winch 20 includes a hand crank 22 for manually adjusting a length of a cable 24 attached to the winch 20 on the lower chute 16. An upper end (not shown) of the cable 24 is attached to the upper chute 14 or another fixed surface positioned above the lower chute 16. Operation of the winch 20 adjusts the length of the cable 24 and thereby the position of the lower chute 16 relative to the upper chute 14 and a vertical height of the chute section 12. Alternatively, the chute 16 may be moved vertically up and down depending on the size of the rail car and the means for movement of the chute 16 may be a hydraulic or other appropriate system. Chains 26 with hooks 28 on opposite ends of each chain engage through rings 30 mounted on the outer surface of the chutes 14, 16 as shown in FIGS. 1 and 2 may be utilized to secure the position of the chutes 14, 16 relative to each other once adjusted to a desired length.

As shown particularly in FIG. 2, a divider 32 is positioned centrally within the assembly 10 and in one embodiment in the upper chute 14 to extend longitudinally between opposite sections of the chute 14. The divider 32 is fixedly mounted within the assembly 10 within the travel path of the grain 18 flowing through the chute section 12 so as to divide the flow of grain 18 into first and second split streams 34a, 34b of grain on opposite sides of the divider 32. In one embodiment, the divider 32 may be an angle iron having a pair of generally perpendicularly oriented legs 36a, 36b with the juncture 38 between the legs oriented medially within the chute section 12 and directed upwardly to thereby divide the flow of grain 18 into the split streams 34a, 34b. The construction and material of the divider 32 may be modified with the respective legs 36 being longer for heavier material flowing through the assembly 10 as is required for a particular application. Moreover, in alternative embodiments of this invention, the position of the divider 32 within the assembly 10 may be adjustable vertically depending upon the desired flow characteristics of the material 18 within the assembly 10. The divider 32 may be of a different design to shift the stream 34 into more than two split streams within this invention.

One advantage that the divider 32 according to various embodiments of this invention is that a region 40 immediately below the divider 32 and generally between the spaced split streams 34a, 34b of material 18 is a void region with little or no grain within the void region 40. Due to the flow characteristics of the particulate material 18 and the divider 32 splitting the flow of material into the split streams 34a, 34b, a significant portion of the dust 42 generated from the flow of the material 18 is entrapped within the void region 40 immediately below the divider 32. As such, the generation of the dust 42 which would normally result from the flow of material 18 is minimized and reduced as it is trapped and concentrated within the void region 40 below the divider 32.

After the split streams 34a, 34b flow past the divider 32 and downstream from the void region 40, they merge back together in a funnel 44 mounted beneath the chute section 12. The funnel 44 includes a pair of opposed tapered sidewalls 46a, 46b which are aligned longitudinally across the assembly 10 and generally parallel with the orientation of the legs 36a, 36b and the longitudinal axis of the divider 32. At the downstream end, narrow portion of the funnel 44, a spout 48 is mounted to the assembly 10. The spout 48 has a pair of spaced, generally parallel outer walls 50a, 50b, each of which extends downwardly from one of the sidewalls 46a, 46b of the funnel 44. A pair of opposed and moveable plates 52a, 52b is mounted within the spout 44 to deflect and guide the grain 18 flowing from the funnel 44 into the spout 48 as shown generally in FIGS. 2-3B. Each plate 52 is an elongate planar member which is mounted by a hinge 54 along its upper edge at the juncture between the spout 48 and the funnel 44. A longitudinal axis of the divider 32 may be parallel to the longitudinal axes of the plates 52a, 52b. A flange 55 is formed or mounted at the distal end of each plate and orientated perpendicularly to the plane of the associated plate 52. In one embodiment, the flange 55 is ¼" key stock. The flanges 55 catch or divert some of the material 18 and assist in movement of the plates 52.

Figure 3A:
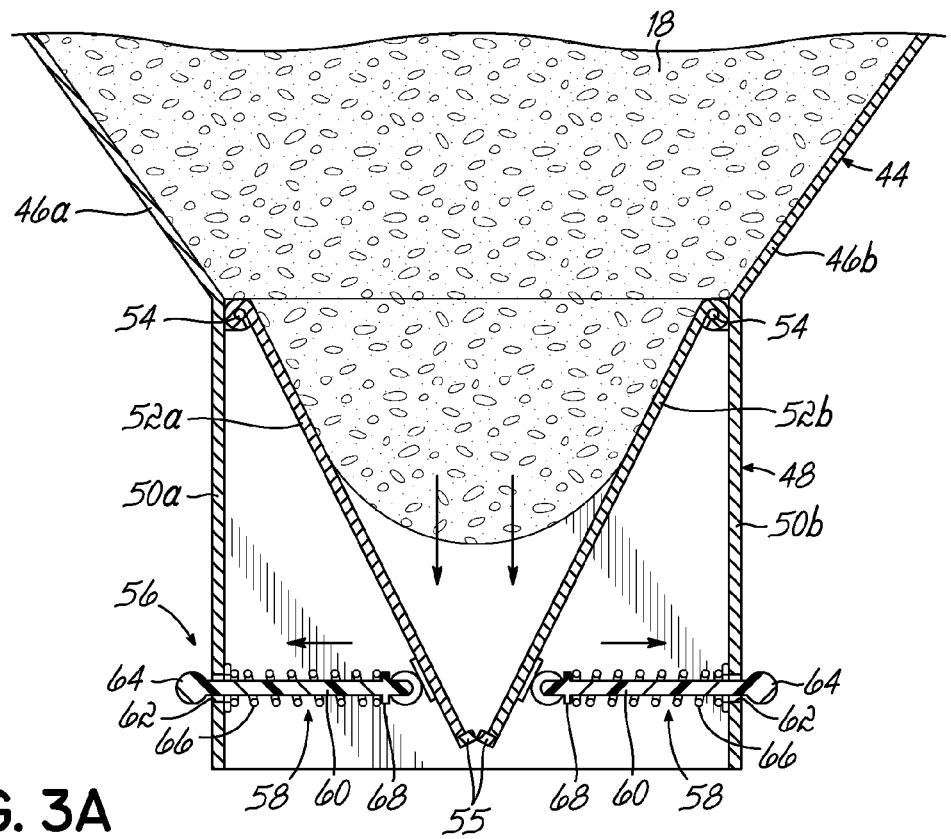
FIGS. 3A-3B are sequential cross-sectional views of grain flowing through a spout of the assembly of FIGS. 1 and 2.
Figure 3B:
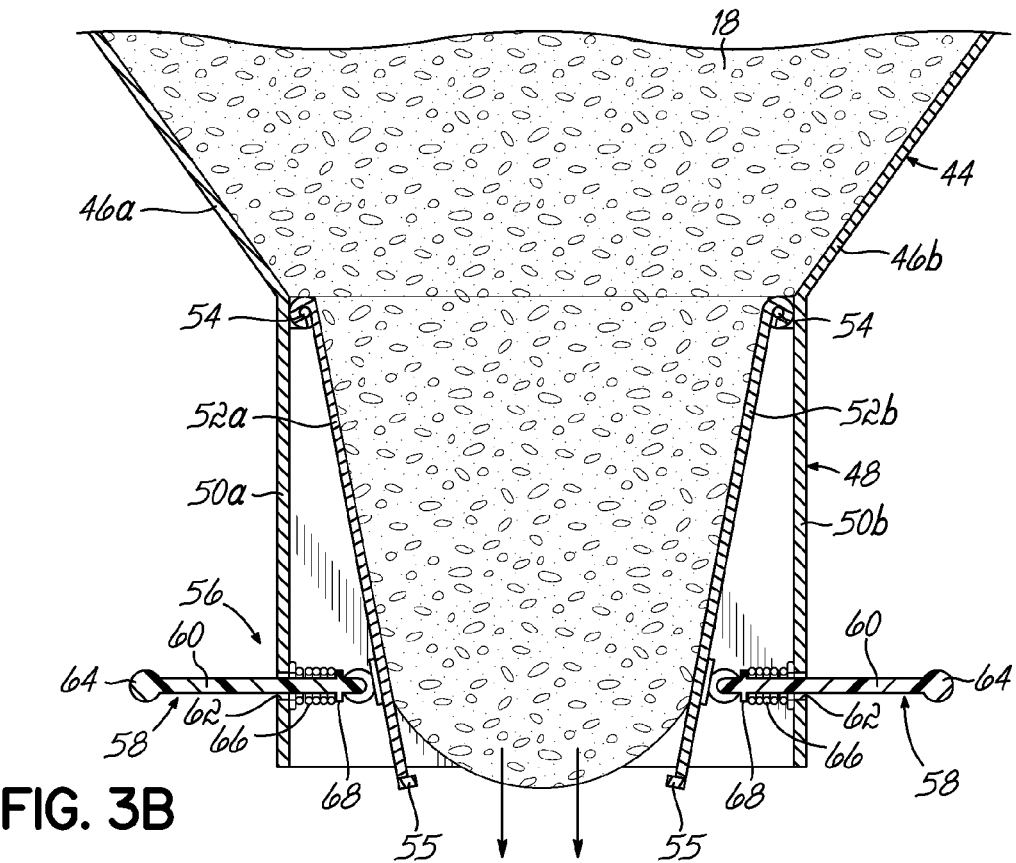
Figure 4:
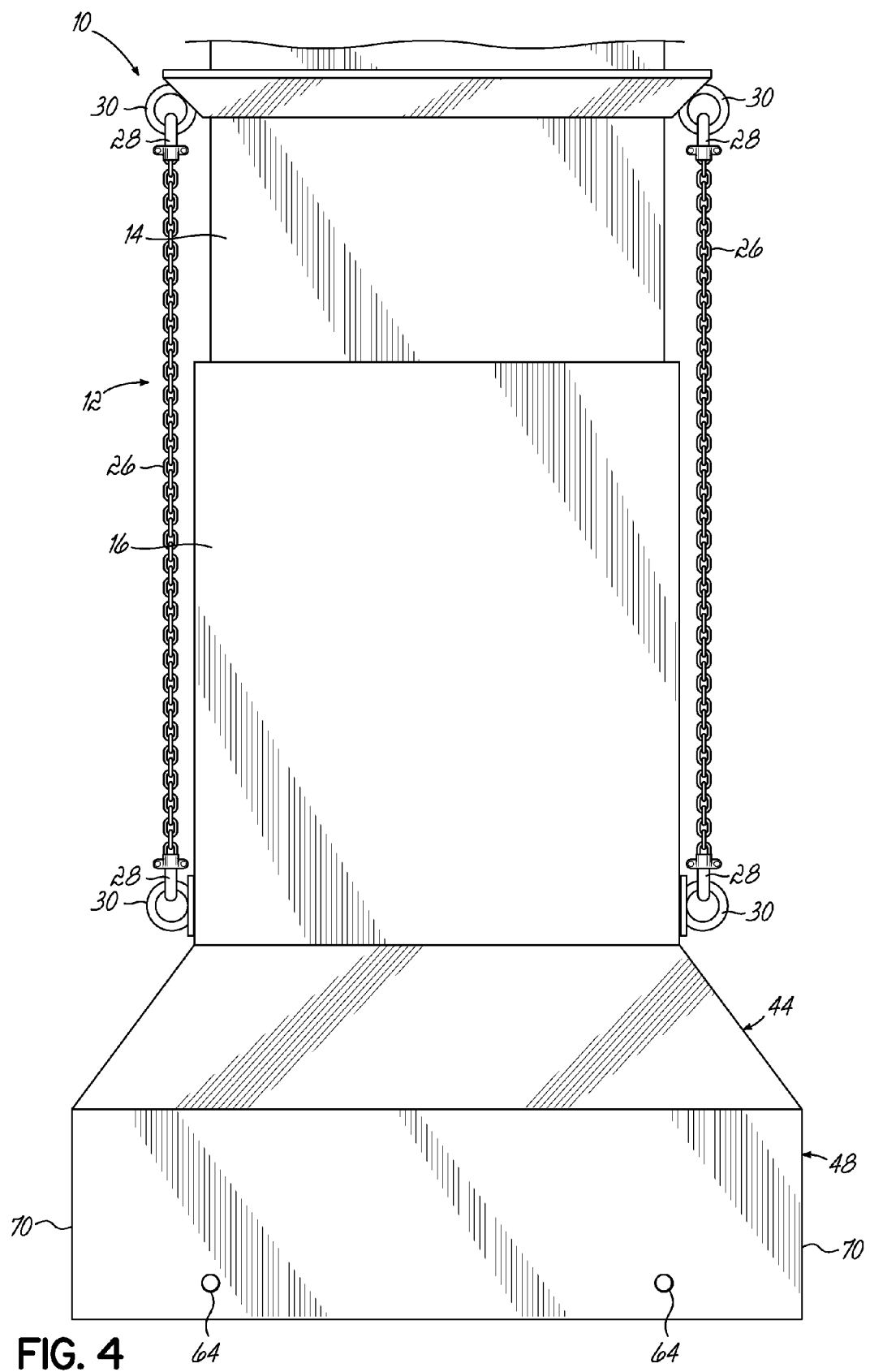
FIG. 4 is a side elevational view of the spout assembly of FIGS. 1-3B.

A counterbalance mechanism 56 in the form of one or more compression spring and rod assemblies 58 is mounted adjacent the lower end of each plate 52. In one embodiment as shown in FIGS. 2-3B, the counterbalance mechanism 56 includes one or more rod and compression spring assemblies 58 with a rod 60 pivotally attached to an outer surface of the plate 52 and extending laterally outwardly through a hole 62 in the outer wall 50 of the spout 48. A knob 64 is formed on the terminal end of the rod 60 on the exterior of the spout 48 as shown in FIGS. 1-3. A compression spring 66 is mounted between an abutment in the form of a nut 68 threaded on the rod 60 and the inner face of the outer wall 50 of the spout 48. The compression spring 66 biases the plate 52 toward the center line of the assembly 10 and the opposite plate and into the path of the grain 18 flowing downwardly from the funnel 44 and into and through the spout 48.

In one embodiment, the counterbalance mechanism 56 includes a pair of opposed plates 52a, 52b with two threaded rod and spring assemblies 58 coupled to each plate 52. One of ordinary skill in the art would appreciate that the biasing force delivered onto each plate 52 may be adjusted depending upon the strength or spring constant of the spring 66 and the number of springs 66 engaging the plate 52. In one embodiment of this invention, two 25 pound springs 66 are mounted to each plate 52 producing a 50 pound biasing force on the plate 52 such that over 50 pounds of grain 18 is needed to deflect the plate 52 outwardly and enlarge the open area in the spout 48 for the grain 18 to flow through and over the plate 52. With the two plates 52a, 52b arrangement shown in FIGS. 1-3 and four 25 pound springs 66 mounted to the plates 52, a total of more than 100 pounds of grain 18 is needed to deflect both of the plates 52a, 52b outwardly as shown in FIG. 3B. As a result, the spout assembly 10 of this invention avoids the clogging of excessive accumulation of material 18 even during surges while minimizing the discharge of dust and fines into the work environment.

As the grain 18 flows through the chute section 12 and around the divider 32, it enters the funnel 44 as the split streams 34a, 34b are merged together. As the grain 18 exits the funnel 44, it enters the spout 48 and engages the plates 52a, 52b. As the weight of the grain 18 impinges upon the plates 52, the plates 52 are urged outwardly against the bias of the counterbalance mechanism 56 to increase the open area for the grain 18 to flow through the spout 48 as shown in FIG. 3B. As the flow of grain 18 decreases, the weight of the grain 18 on the plates 52 likewise decreases and the bias of the counterbalance mechanism springs 66 urges the plates 52 inwardly thereby directing and focusing the flow of the grain 18 through the assembly 10.

Advantageously, the void region 40 entraps the dust 42 and collects it and circulates it back into the split streams 34a, 34b of grain thereby minimizing the escape of the dust during the transfer process of the grain through the assembly 10. The opposing ends of the funnel 44 and spout 48 may be capped with opposing end plates 70 as shown in FIG. 1.

Figure 5:
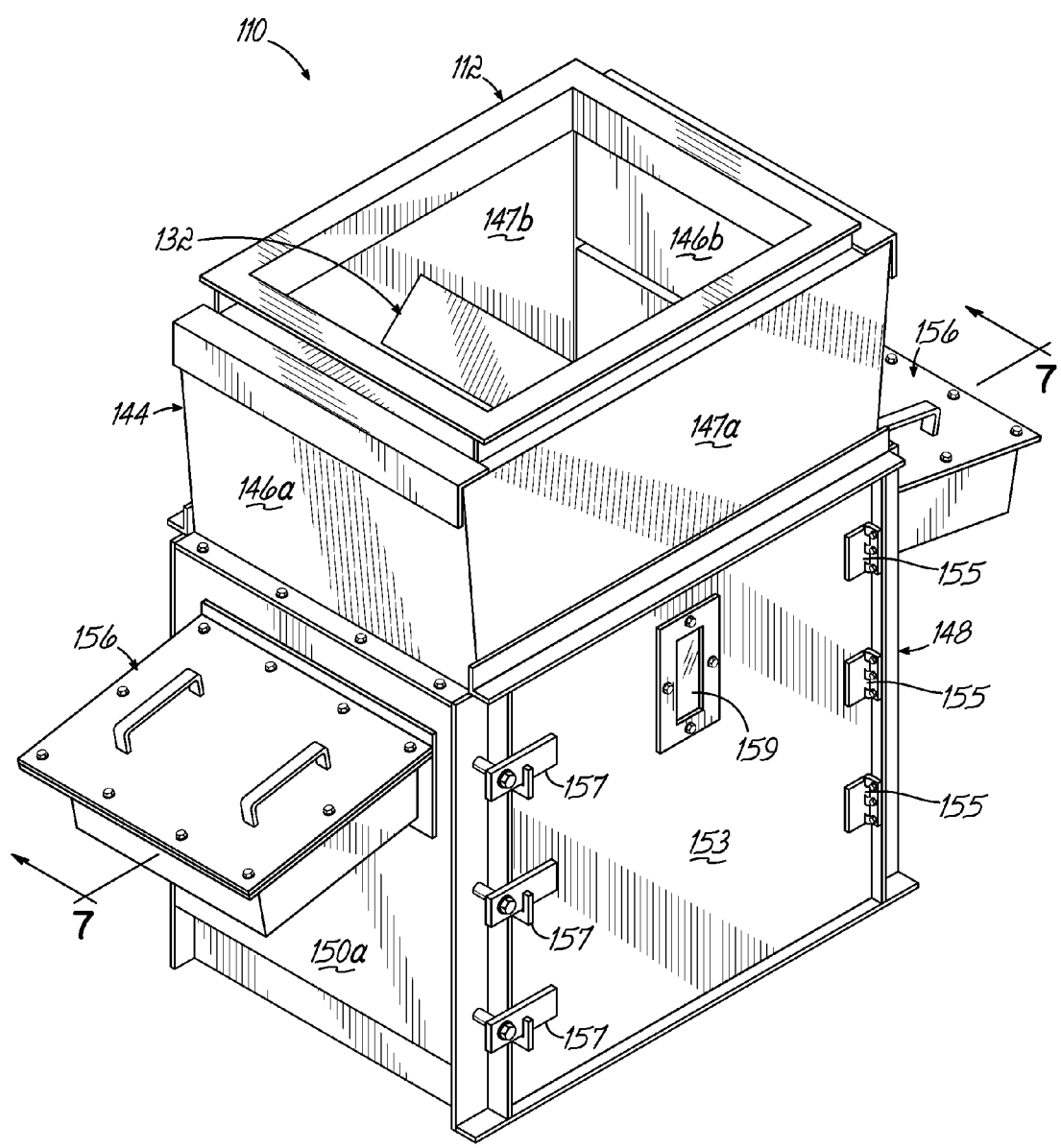
FIG. 5 is a perspective view of an alternative embodiment of this invention.
Figure 6:
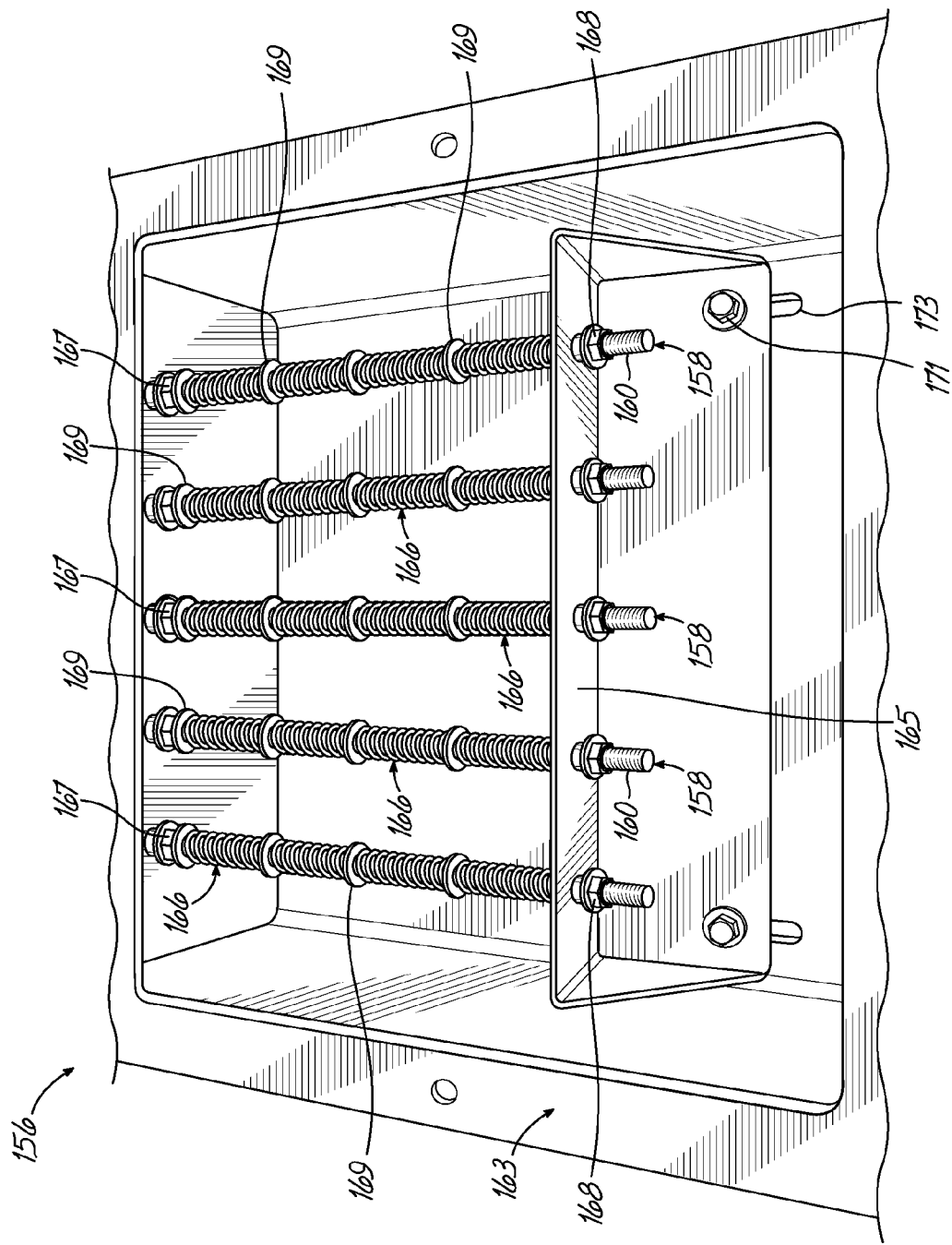
FIG. 6 is a view of a counter-balance mechanism of the embodiment of FIG. 5.
Figure 7:
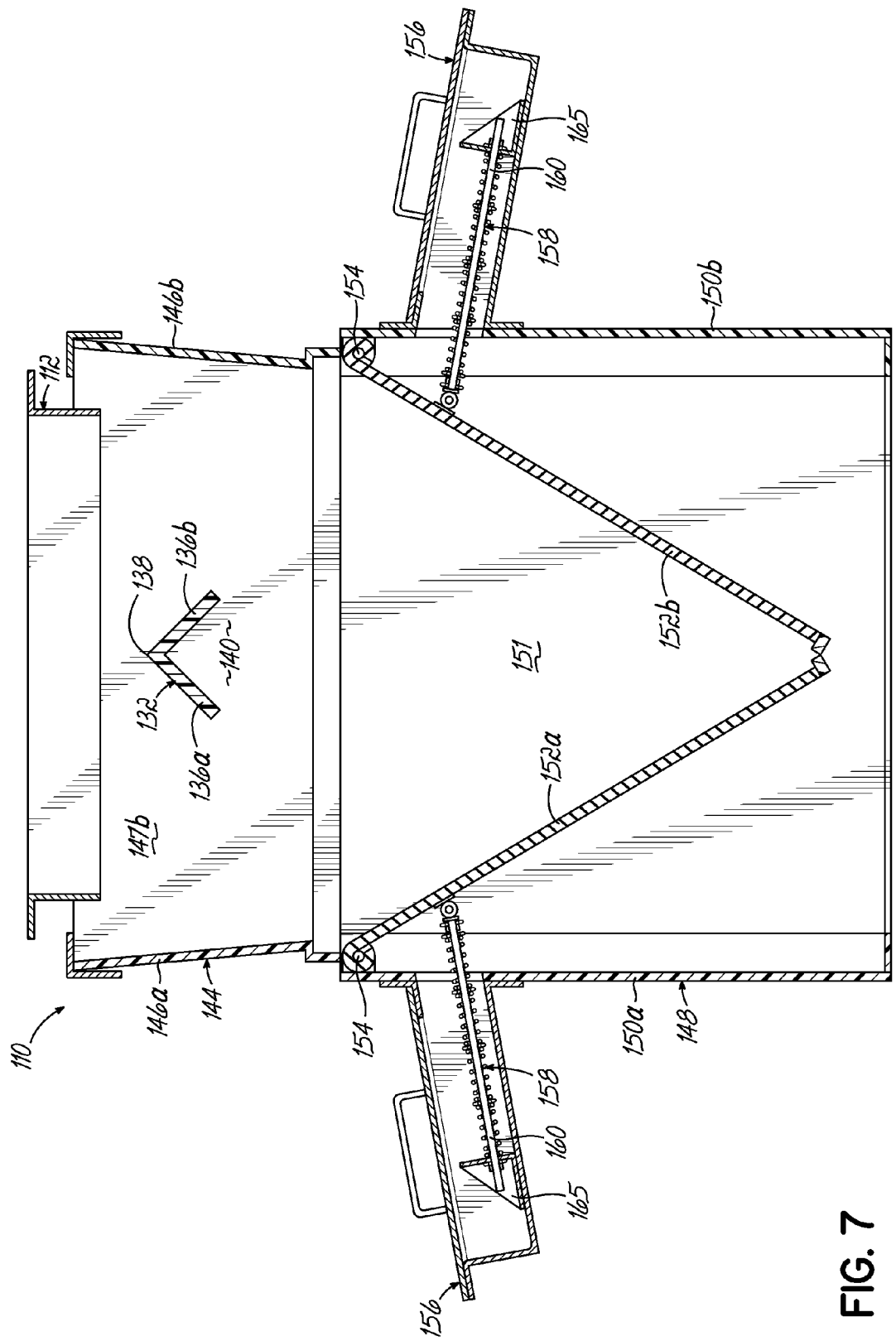
FIG. 7 is a cross-sectional view taken along line 7-7 of the embodiment of FIG. 5.

Referring to FIGS. 5-7, a second embodiment of a dustless spout assembly no according to this invention is shown. The assembly 110 includes an upper chute section 112. In operation, the spout assembly 110 is particularly adapted for the transfer of soybeans or other particulate material in a generally vertical downward direction from a supply of soybeans into a rail car, cargo hold or other receptacle at the downstream exit end of the assembly 110.

A funnel 144 is located downstream from the chute section 112 and includes a pair of opposed tapered sidewalls 146a, 146b and a pair of opposed sidewalls 147a, 147b to form a rectangular funnel 144. The tapered sidewalls 146a, 146b are generally parallel with the orientation of legs 136a, 136b of a divider 132 mounted in the funnel 144 and in the flow path of the material. At the downstream end, narrow portion of the funnel 144, a spout 148 is mounted to the assembly 110. The spout 148 has a pair of spaced, generally parallel outer walls 150a, 150b, each of which extends downwardly from one of the sidewalls 146a, 146b of the funnel 144. A back wall 151 is mounted between the outer walls 150a, 150b. A door 153 is opposite the back wall 151 and is pivotally mounted to an edge of the wall 150b by one or more hinges 155. The door 153 may be secured closed by one or more latch assemblies 157. A port or window 159 may be included in the door 153.

As shown particularly in FIG. 7, the divider 132 is positioned centrally within the funnel 144 to extend longitudinally between opposite sections of the funnel 144. The divider 132 is fixedly mounted within the funnel 144 within the travel path of the soybeans flowing from the chute section 112 so as to divide the flow of soybeans into first and second split streams on opposite sides of the divider 132. In one embodiment, the divider 132 may have a pair of generally perpendicularly oriented legs 136a, 136b with the juncture 138 between the legs oriented medially within the funnel 144 and directed upwardly to thereby divide the flow of soybeans into the split streams.

One advantage that the divider 132 according to various embodiments of this invention is that a region 140 immediately below the divider 32 and generally between the spaced split streams of material is a void region with little or no material within the void region 140. Due to the flow characteristics of the particulate material and the divider 132 splitting the flow of material into the split streams, a significant portion of the dust generated from the flow of the material is entrapped within the void region 140 immediately below the divider 132. As such, the generation of the dust which would normally result from the flow of material is minimized and reduced as it is trapped and concentrated within the void region 140 below the divider 132.

A pair of opposed and moveable plates 152a, 152b is mounted within the assembly 110 to deflect and guide the soybeans flowing from the funnel 144 into the spout 148 as shown generally in FIGS. 5-7. Each plate 152 is a planar member which is mounted by a hinge 154 along its upper edge at the juncture between the spout 148 and the funnel 144.

After the split streams flow past the divider 132 and downstream from the void region 140, they merge back together in the funnel 144 mounted beneath the chute section 112. A counterbalance mechanism 156 in the form of one or more compression spring and rod assemblies 158 is mounted adjacent the lower end of each plate 152. In one embodiment as shown in FIGS. 5-7, the counterbalance mechanism 156 includes one or more rod and compression spring assemblies 158 with a rod 160 pivotally attached to an outer surface of the plate 152 and extending laterally outwardly within a housing 163 adjacent to the outer wall 150 of the spout 148. A compression spring 166 is mounted between an abutment in the form of a brace plate 165 and a nut 168 threaded on the rod 160 and the inner face of the outer wall 150 of the spout 148. The compression spring 166 biases the plate 152 toward the center line of the assembly 110 and the opposite plate and into the path of the soybeans flowing downwardly through the funnel 144 and into and through the spout 148.

Each spring and rod assembly 158 is mounted within the housing 163 and between one of the plates 152 and a brace plate 165. A series of nuts 167 are each threaded onto one of the rods 160 and washers 169 may be spaced on the rod 160 and associated spring 166. The biasing force delivered to the plate 152 may be adjusted in a number of ways. The position of the nut 168 adjacent the plate 165 on the rod 160 may be adjusted to compress or decompress the associated spring 166. Similarly, the nut 167 on the opposite end of the rod 160 may be adjusted also. Additionally, the position of the brace plate 165 within the housing 163 may be adjusted via mounting bolts 171 securing the brace plate 165 along a slot 173 in the housing 163. Moreover, springs 166 of different strength and/or spring constants can be used to vary the biasing force on the plates 152. The biasing force on one plate 152a may be adjusted to be different from or the same as the biasing force on the other plate 152b, as needed.

In one embodiment, the counterbalance mechanism 156 includes the pair of opposed plates 152a, 152b with five threaded rod and spring assemblies 158 coupled to each plate 152. One of ordinary skill in the art would appreciate that the biasing force delivered onto each plate 152 may be adjusted depending upon the strength or spring constant of the spring 166 and the number of springs 166 engaging the plate 152, in one embodiment of this invention. As a result, the spout assembly 110 of this invention avoids the clogging of excessive accumulation of material even during surges while minimizing the discharge of dust and fines into the work environment.

As the soybeans flow through the chute section 112 and around the divider 132 in the funnel 144 as the split streams are merged together. As the material exits the funnel 144, it enters the spout 148 and engages the plates 152a, 152b. As the weight of the material impinges upon the plates 152, the plates 152 are urged outwardly against the bias of the counterbalance mechanism 156 to increase the open area for the material to flow through the spout 148. As the flow of material decreases, the weight of the material on the plates 152 likewise decreases and the bias of the counterbalance mechanism springs 166 urges the plates 152 inwardly thereby directing and focusing the flow of the material through the assembly 110. Advantageously, the void region 140 entraps the dust and collects it and circulates it back into the split streams of material thereby minimizing the escape of the dust during the transfer process of the material through the assembly 110.

The invention is described herein for use in controlling the flow of grain, soybeans or other particulate material, and it is readily useful for other materials. The particulate material streams or flows through the assembly and drops directly into the chamber of the cargo carrier below. The cross-sectional area of the opening in the spout may be smaller than the cross-sectional area of the channel section so that a mass of particulate material tends to accumulate at the funnel and above the opening in the spout. The accumulated particulate material mass reduces the velocity of the particulate material without clogging the stream of material.

The quantity of particulate material, the variable diameter of the flow stream, the variable speed of the flow or height of drop of the material in addition to the kind of grain or particulate material and the associated weight thereof are factors which may be considered when adjusting the counterbalance mechanism. The counterbalance mechanism provides for a variable biasing force or a resistance upon a downward flow of the particulate material so that the variable input forces available from respective parameters of the particulate material are offset by the variable biasing or reaction forces delivered by the counterbalancing mechanism to the plates. This invention provides a highly sensitive counterbalancing mechanism for acute and precise adjustment based on the proper particulate material flow parameters and operation depending upon the particular type of grain or material. Moreover, one or more features of the assembly, including, but not limited to, the divider, funnel, spout, counterbalance mechanism and plates, contribute to the reduction of dispersed dust and controlled flow of the material.

According to another embodiment, a method of retrofitting a conduit through which particulate material flows in a generally downward direction is described. The conduit includes a regulator for controlling the flow of the material therethrough, the regulator includes a plurality of downwardly and inwardly sloping plates having lower ends in the path of the flowing material in the conduit, and the plates slowing the movement of the material and deflecting the material toward a longitudinal axis of the conduit. The method includes coupling a counterbalance mechanism to the plates to deliver a biasing force on the plates inwardly in a direction tending to reduce a size of an opening defined by lower ends of the plates through which the material flows. The method also includes restricting the fall of the material and slowing movement through the opening with the plates. The method also includes dividing the flowing stream into a plurality of split streams. The method also includes adjusting the biasing force delivered by the counterbalance mechanism on the plates.

The dividing step may be performed prior to the restricting step. The method may also include delivering the biasing force to the plates through a spring mounted relative to a portion of the counterbalance mechanism for contact with the respective plate. The method may also include adjusting the biasing force delivered to selected ones of the plates without adjusting the biasing force delivered to a remainder of the plates. The biasing force may be adjusted as a function of a spring constant of the spring.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. A method of regulating the flow of a stream of particulate material which is falling in a downwardly oriented conduit, the method comprising:
   interposing at least one plate having a lower end in the path of the flowing stream in the conduit, the plate slowing the movement of the material and deflecting the material toward a longitudinal axis of the conduit;
   providing a central opening adjacent the lower end of the plate;

yieldably biasing the plate inwardly in a direction tending to reduce the size of the opening with a biasing force delivered by a counterbalance mechanism operably coupled to the plate, the plate restricting the fall of the material and slowing movement through the central opening;

dividing the flowing stream into a plurality of split streams and a region for entrapping dust adjacent to the split streams using a non-rotatable divider positioned upstream from the plate;

allowing the split streams and the region to merge together prior to engaging the plate; and continuously discharging particles through the opening while varying the size of the opening adjacent the plate as the weight of the mass of material above said opening changes with flow rate variations of the material, the size of the opening increasing as the weight of the mass increases in response to an increase in the flow rate of the material.

2. The method of claim 1 wherein the dividing step is performed prior to the continuously discharging step.

3. The method of claim 1 wherein the interposing step further comprises interposing at least two opposing plates in the path of the stream.

4. The method of claim 1 further comprising:
delivering the biasing force to the at least one plate through a spring mounted relative to a portion of the counterbalance mechanism for contact with an outer surface of the plate.

5. The method of claim 2 wherein the biasing force delivered to selected ones of the plates is adjusted without adjusting the biasing force delivered to a remainder of the plates.

6. The method of claim 4 wherein the biasing force is adjusted as a function of a spring constant of the spring.

7. A method of retrofitting a conduit through which particulate material flows in a generally downward direction, the conduit including a regulator for controlling the flow of the material therethrough, the regulator including a plurality of downwardly and inwardly sloping plates having lower ends in the path of the flowing material in the conduit, the plates slowing the movement of the material and deflecting the material toward a longitudinal axis of the conduit, the method comprising:

coupling a counterbalance mechanism to the plates to deliver a biasing force on the plates inwardly in a direction tending to reduce a size of an opening defined by lower ends of the plates through which the material flows;

restricting the fall of the material and slowing movement through the opening with the plates;

dividing the flowing stream into a plurality of split streams and a region for entrapping dust adjacent to the split streams using a non-rotatable divider positioned upstream from the plates;

allowing the split streams and the region to merge together prior to engaging the plates; and adjusting the biasing force delivered by the counterbalance mechanism on the plates.

8. The method of claim 7 wherein the dividing step is performed prior to the restricting step.

9. The method of claim 7 further comprising:
delivering the biasing force to the plates through a spring mounted relative to a portion of the counterbalance mechanism for contact with the respective plate.

10. The method of claim 9 further comprising:
adjusting the biasing force delivered to selected ones of the plates without adjusting the biasing force delivered to a remainder of the plates.

11. The method of claim 9 wherein the biasing force is adjusted as a function of a spring constant of the spring.

12. An apparatus for regulating the flow of particulate material comprising:

a chute adapted to receive the flow of particulate material;

an array of plates downstream from the chute, each of the plates having a lower end and being coupled to the chute, each of the plates projecting toward a centerline axis of the conduit, the lower ends of the plates defining an opening with an area that is smaller than a cross-sectional area of the chute so that the material may accumulate prior to passing through the opening;

a non-rotatable divider positioned upstream from the plates to divide the particulate material into a plurality of split streams and a region for entrapping dust adjacent to the split streams, the divider being positioned relative to the plates so as to allow the split streams and the region to merge together prior to engaging the plates; and a counterbalance mechanism coupled to the plates to produce a biasing force on the plates and bias the plates toward the centerline and adjust the area of the opening, the counterbalance mechanism permitting the plates to move outwardly away from the centerline in response to the weight of the accumulated material.

13. The apparatus of claim 12 wherein the counterbalance mechanism further comprises:
at least one spring producing a biasing force delivered by the counterbalance mechanism on the plates.

14. The apparatus of claim 12 wherein each of the plates has a distinct and separately adjustable counterbalance mechanism coupled thereto.

15. The apparatus of claim 12 wherein a longitudinal axis of the divider is oriented generally parallel to a longitudinal axis of each of the plates.

16. The apparatus of claim 12 wherein the divider is positioned relative to the array of plates so as to allow the split streams to entrain the dust therein.

17. The apparatus of claim 12 further comprising:
a funnel upstream of the array of plates;
wherein each of the plates is pivotally coupled to a downstream portion of the funnel.

18. The apparatus of claim 12 wherein a length of the chute is adjustable.

19. The apparatus of claim 12 wherein the biasing force is oriented generally perpendicular to a longitudinal axis of the chute.

20. The apparatus of claim 12 wherein the divider is shaped as an angle iron having a pair of generally perpendicularly oriented legs and a juncture between the legs oriented medially within the chute and directed upwardly to thereby divide the flow of grain into the split streams.

21. The apparatus of claim 12 wherein the divider is vertically adjustable relative to the opening defined by the lower ends of the plates.

22. The apparatus of claim 12 wherein each of the plates is an elongate planar member and includes a flange that is formed or mounted at the distal end of each elongate planar member.

23. An apparatus for regulating the flow of particulate material comprising:
a chute adapted to receive the flow of particulate material;
wherein a length of the chute is adjustable;
an array of plates downstream from the chute, each of the plates having a lower end and being coupled to the chute, each of the plates projecting toward a centerline axis of the conduit, the lower ends of the plates defining an opening with an area that is smaller than a cross-sectional area of the chute so that the material may accumulate prior to passing through the opening;
a counterbalance mechanism coupled to the plates to produce a biasing force on the plates and bias the plates toward the centerline and adjust the area of the opening, the counterbalance mechanism permitting the plates to move outwardly away from the centerline in response to the weight of the accumulated material;
wherein the counterbalance mechanism further comprises at least one spring producing a biasing force delivered by the counterbalance mechanism on the plates;
wherein each of the plates has a distinct and separately adjustable counterbalance mechanism coupled thereto;
wherein the biasing force is oriented generally perpendicular to a longitudinal axis of the chute;
a divider positioned upstream from the array of plates to divide the particulate material into a plurality of split streams and a region for entrapping dust adjacent to the split streams;
wherein a longitudinal axis of the divider is oriented generally parallel to a longitudinal axis of each of the plates;
wherein the divider is positioned relative to the array of plates so as to allow the split streams to entrain the dust therein and so as to allow the split streams to merge together prior to engaging the array of plates; and
a funnel upstream from the array of plates;
wherein each of the plates is pivotally coupled to a downstream portion of the funnel.

\* \* \* \* \*